United States Patent
Suwald et al.

(10) Patent No.: US 10,372,966 B2
(45) Date of Patent: Aug. 6, 2019

(54) FINGERPRINT SENSING SYSTEM AND METHOD

(71) Applicant: NXP B.V., Eindhoven (NL)

(72) Inventors: Thomas Suwald, Hamburg (DE); Arne Burghardt, Hamburg (DE)

(73) Assignee: NXP B.V., Eindhoven (NL)

( * ) Notice: Subject to any disclaimer, the term of this patent is extended or adjusted under 35 U.S.C. 154(b) by 49 days.

(21) Appl. No.: 15/457,954

(22) Filed: Mar. 13, 2017

(65) Prior Publication Data

US 2017/0262689 A1    Sep. 14, 2017

(30) Foreign Application Priority Data

Mar. 11, 2016 (EP) ..................................... 16159869

(51) Int. Cl.
*G06K 9/00* (2006.01)

(52) U.S. Cl.
CPC ......... *G06K 9/0012* (2013.01); *G06K 9/0002* (2013.01); *G06K 9/00087* (2013.01); *G06K 2009/00932* (2013.01)

(58) Field of Classification Search
None
See application file for complete search history.

(56) References Cited

U.S. PATENT DOCUMENTS

| | | | | |
|---|---|---|---|---|
| 2008/0191839 A1* | 8/2008 | Sato | ........................ | G06F 21/35 340/5.82 |
| 2009/0166411 A1* | 7/2009 | Kramer | ................ | A61B 5/1172 235/382 |
| 2009/0232367 A1* | 9/2009 | Shinzaki | ............... | G06K 9/0012 382/124 |
| 2010/0133952 A1 | 5/2010 | Raguin et al. | | |
| 2011/0170750 A1* | 7/2011 | Kropp | ................ | A61B 5/02444 382/124 |
| 2011/0299740 A1* | 12/2011 | Mori | .................... | A61B 5/0059 382/115 |
| 2014/0140588 A1* | 5/2014 | Chou | ................... | G06K 9/0002 382/124 |
| 2014/0362013 A1 | 12/2014 | Nikoozadeh et al. | | |
| 2015/0015537 A1* | 1/2015 | Riedijk | ................... | G06F 3/044 345/174 |

(Continued)

OTHER PUBLICATIONS

Wonseok Song et al: "A finger-vein verification system using mean curvature", Pattern Recognition Letters, vol. 32, No. 11, 2011, pp. 1541-1547, XP028228943, ISSN: 0167-8655, DOI: 10.1016/J.PATREC.2011.04.021 [retrieved on May 1, 2011].

(Continued)

*Primary Examiner* — Sean M Conner

(57) ABSTRACT

According to a first aspect of the present disclosure, a fingerprint sensing system is provided, comprising: at least one sensing element configured and arranged to generate a sensing characteristic; a detection unit configured and arranged to detect changes of said sensing characteristic over time; a processing unit configured and arranged to determine if the changes of said sensing characteristic substantially conform to a predefined liveness function. According to a second aspect of the present disclosure, a corresponding fingerprint sensing method is conceived. According to a third aspect of the present disclosure, a corresponding computer program product is provided.

12 Claims, 4 Drawing Sheets

(56) References Cited

U.S. PATENT DOCUMENTS

2016/0246396 A1\* 8/2016 Dickinson .......... G06F 3/03545

OTHER PUBLICATIONS

Derakhshani R et al: "Determination of vitality from a non-invasive biomedical measurement for use in fingerprint scanners", Pattern Recognition, Elsevier, GB, vol. 36, No. 2, Feb. 2003 (Feb. 2003), pp. 383-396, XP004389399, ISSN: 0031-3203, DOI: 10.1016/S0031-3203(02)00038-9.
Stan Z. Li: "Vein" In: "Encyclopedia of Biometrics", Aug. 27, 2009 (Aug. 27, 2009), Springer, XP055275885, p. 1374.

\* cited by examiner

FINGERPRINT SENSING SYSTEM AND METHOD

FIELD

The present disclosure relates to a fingerprint sensing system. Furthermore, the present disclosure relates to a corresponding fingerprint sensing method and to a corresponding computer program product.

BACKGROUND

Today, many electronic devices and systems require a form of user authentication. For example, in a payment system, a smart card may be used to initiate a payment and to authenticate a user. In addition to conventional user authentication via a personal identification number (PIN), a smart card may also include a fingerprint sensor for capturing the user's fingerprint. In that case, the captured fingerprint may be used to ascertain that the smart card is presented to a terminal by its rightful owner, for example. However, it is difficult to determine whether a captured fingerprint belongs to a living person. The same may apply to other devices, such as mobile phones or tablets, which are used for transactions and use fingerprint-based user authentication.

SUMMARY

According to a first aspect of the present disclosure, a fingerprint sensing system is provided, comprising: at least one sensing element configured and arranged to generate a sensing characteristic; a detection unit configured and arranged to detect changes of said sensing characteristic over time; a processing unit configured and arranged to determine if the changes of said sensing characteristic substantially conform to a predefined liveness function.

In one or more embodiments, the sensing characteristic is a sensing capacitance.

In one or more embodiments, the liveness function represents sensing capacitance changes resulting from pulsating blood.

In one or more embodiments, the liveness function is a reference function stored in a storage unit of the fingerprint sensing system.

In one or more embodiments, the system further comprises an array of sensing elements, each sensing element being configured and arranged to generate a sensing characteristic, the detection unit further being configured and arranged to detect changes of each sensing characteristic over time, and the processing unit further being configured and arranged to determine if at least one of the changes of said sensing characteristic substantially conforms to the predefined liveness function.

In one or more embodiments, the processing unit is further configured and arranged to identify, for each change that substantially conforms to the predefined liveness function, a relative position of the corresponding sensing element in the array of sensing elements.

In one or more embodiments, the processing unit is further configured and arranged to verify if the relative position is present in a predefined map of relative positions.

In one or more embodiments, the processing unit is further configured and arranged to provide the relative position to a secure element.

In one or more embodiments, the predefined map of relative positions represents a blood vessel pattern.

In one or more embodiments, the array of sensing elements has the form of a matrix.

In one or more embodiments, the sensing element is a sensing plate.

In one or more embodiments, a smart card comprises the fingerprint sensing system of the kind set forth.

According to a second aspect of the present disclosure, a fingerprint sensing method is conceived, wherein: at least one sensing element generates a sensing characteristic; a detection unit detects changes of said sensing characteristic over time; a processing unit determines if the changes of said sensing characteristic substantially conform to a predefined liveness function.

According to a third aspect of the present disclosure, a computer program product is provided, the computer program product comprising instructions which, when executed, carry out or control the method of the kind set forth.

DESCRIPTION OF DRAWINGS

Embodiments will be described in more detail with reference to the appended drawings, in which.

DESCRIPTION OF EMBODIMENTS

Figure 1:
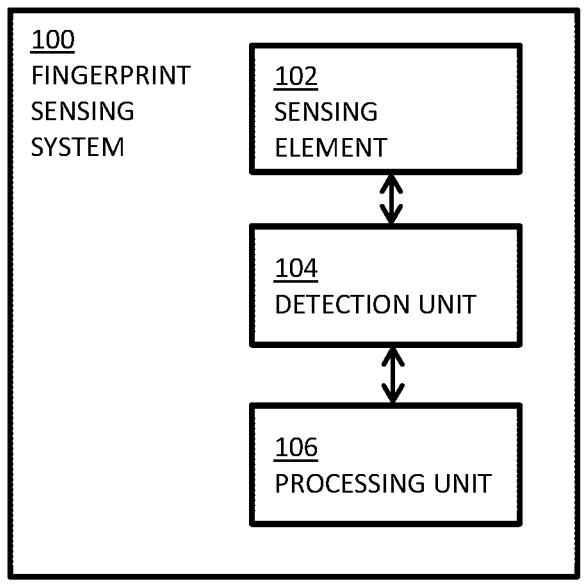
FIG. 1 shows an illustrative embodiment of a fingerprint sensing system.

FIG. 1 shows an illustrative embodiment of a fingerprint sensing system 100. The fingerprint sensing system 100 comprises a sensing element 102 which is operatively coupled to a detection unit 104. Furthermore, the fingerprint sensing system 100 comprises a processing unit 106 which is operatively coupled to the detection unit 104. The sensing element 102, the detection unit 104 and the processing unit 106 are configured and arranged to perform the operations described with reference to FIG. 2.

Figure 2:
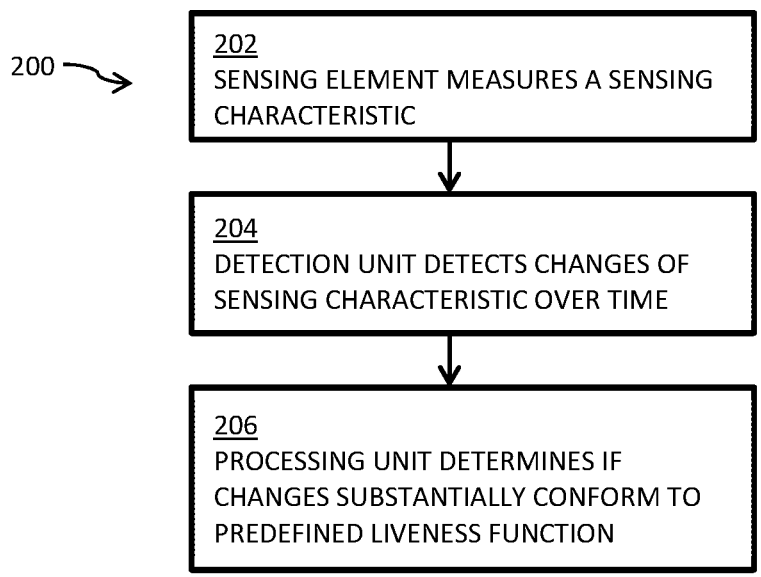
FIG. 2 shows an illustrative embodiment of a fingerprint sensing method.

FIG. 2 shows an illustrative embodiment of a fingerprint sensing method 200. The fingerprint sensing method 200 comprises the following steps. At 202, the sensing element 102 generates a sensing characteristic. At 204, the detection unit 104 detects changes of said sensing characteristic over time. Furthermore, at 206, the processing unit 106 determines if the changes of said sensing characteristic substantially conform to a predefined liveness function. Thereby, determining whether a captured fingerprint belongs to a living person is facilitated.

In a practical and efficient implementation, the sensing characteristic is a sensing capacitance. The skilled person will appreciate that the sensing characteristic may also be another measurable characteristic, for example a characteristic measured by a sensing element of an optical, thermal or ultrasonic fingerprint sensing system. As mentioned above, in one or more embodiments, the liveness function represents sensing capacitance changes resulting from pulsating blood. In particular, the so-called valley depth, i.e. the distance between the surface of a finger and the surface of a sensing element, may change periodically as a result of pulsating blood and the related blood pressure. The changes of the valley depth will in turn result in corresponding changes of the sensing capacitance. Thus, in a practical yet reliable implementation, a function that reflects the sensing capacitance changes resulting from pulsating blood may be used as the predefined liveness function. In a practical and efficient implementation, the liveness function may be a reference function stored in a storage unit of the fingerprint sensing system. The skilled person will appreciate that, instead or in addition to pulsating blood, other liveness attributes may be used, such as blood pressure variations, optical variations, and humidity variations, for example. Furthermore, in practice a margin of error may be used, in the sense that only detected changes of the sensing characteristic whose magnitude exceeds a predefined threshold may be taken into account by the processing unit; thus, if a detected change is smaller than said threshold, it may be disregarded.

Figure 3:
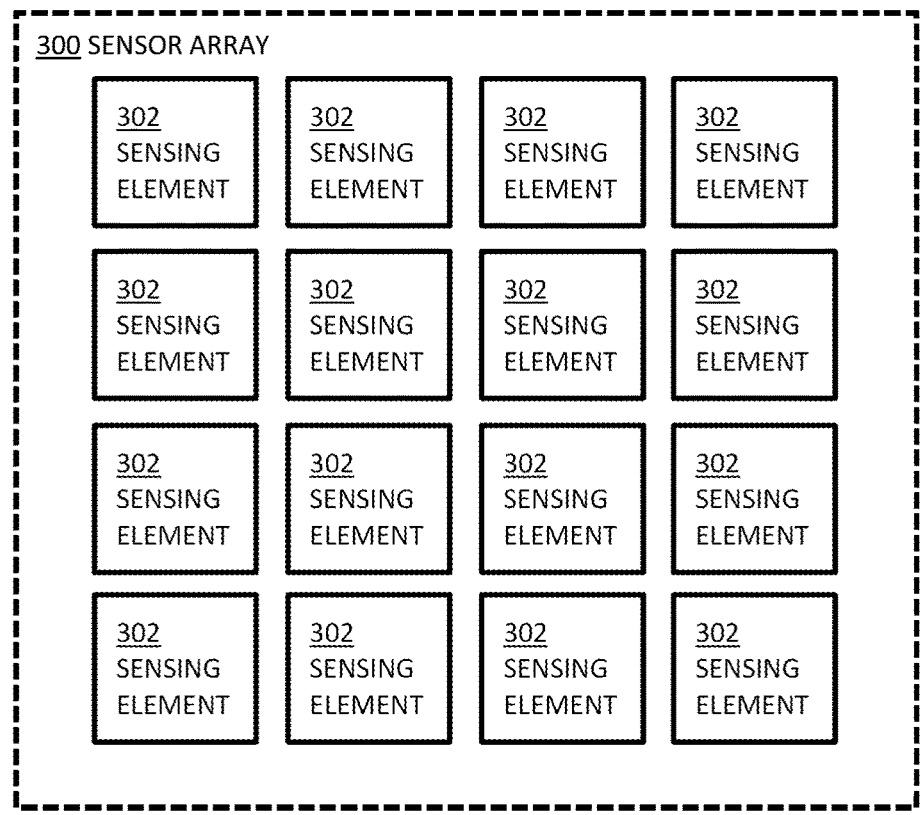
FIG. 3 shows an illustrative embodiment of a sensor array.

FIG. 3 shows an illustrative embodiment of a sensor array 300. The sensor array 300 comprises a plurality of sensing elements 302 of the kind set forth. The array 300 may have the form of a matrix, for example having a large number of rows and columns, thereby facilitating the sensing of a complete fingerprint. In a practical implementation, which is easy to realize, the sensing elements may be sensing plates. More specifically, the fingerprint sensing system may comprise a plurality of sensing plates organized in a matrix, and the sensing plates may form direct field sensing capacitances between the sensing plate and the finger's surface. The direct field sensing capacitance formed by a specific sensing plate is dependent on the distance between the sensing plate and the finger's surface. These direct field sensing capacitances are periodically evaluated in order to create a data representation of the fingerprint.

Figure 4:
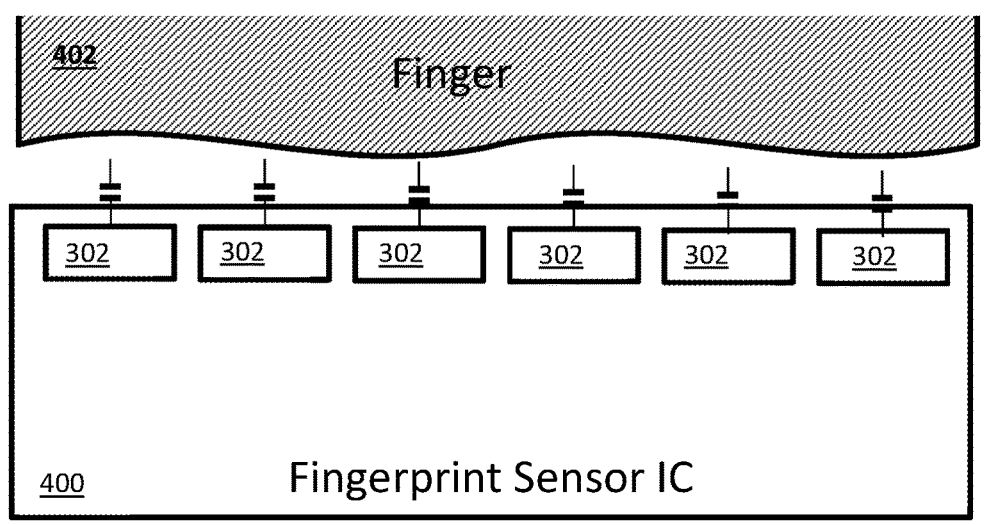
FIG. 4 shows an illustrative embodiment of a fingerprint sensor IC.

FIG. 4 shows an illustrative embodiment of a fingerprint sensor integrated circuit (IC) 400. The fingerprint sensing system 100 of the kind set forth may be conveniently integrated in an IC. Thus, the IC 400 may include the array of sensing elements 302. If current is provided to these sensing elements 302, and an object such as a finger 402 is in their proximity, sensing capacitances are formed between the respective sensing elements 302 and the finger's surface. These sensing capacitances may be measured and may provide a reliable indication of the distance between the respective sensing elements 302 and the finger's surface (i.e., of the valley depth). It is noted that the sensing capacitances may conveniently be evaluated in sequence, i.e. by providing current to the respective sensing elements 302 in sequence and measuring the corresponding generated sensing capacitances. A sensing element 302 to which current is provided may be referred to as an active element.

Thus, in one or more embodiments, the system further comprises an array of sensing elements. Each sensing element is configured and arranged to generate a sensing characteristic. Furthermore, the detection unit is further configured and arranged to detect changes of each sensing characteristic over time, and the processing unit is further configured and arranged to determine if at least one of the changes of said sensing characteristic substantially conforms to the predefined liveness function. Thereby, the reliability of liveness verifications may be increased, since they may depend on a plurality of liveness features instead of a single liveness feature. It is noted that the term "liveness feature" refers, in this context, to a positive determination that the changes over time of a single sensing characteristic substantially conform to the predefined liveness function.

Figure 5:
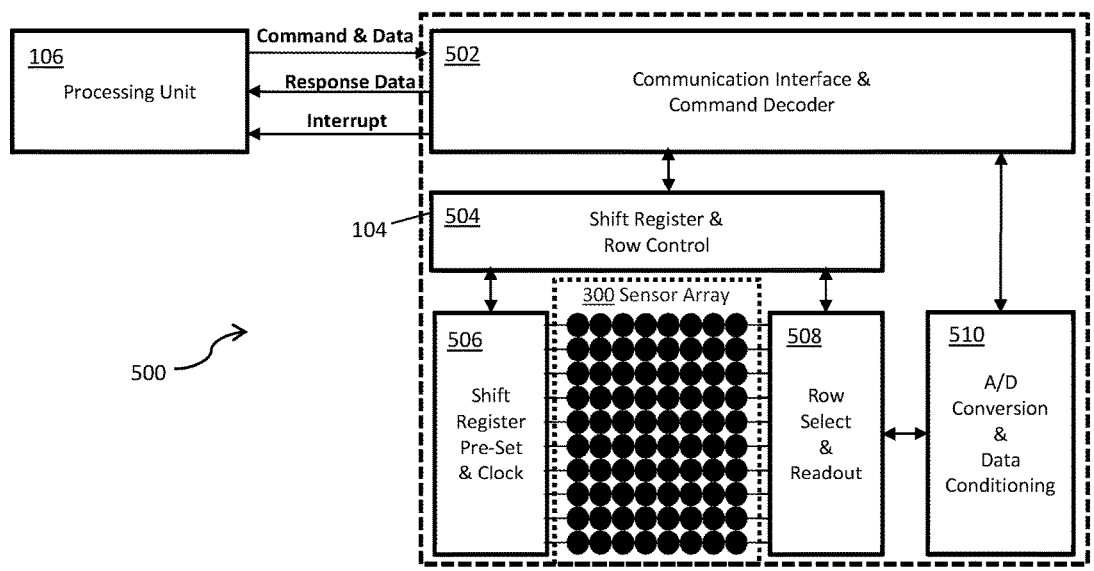
FIG. 5 shows an illustrative embodiment of a fingerprint sensing system implementation.

FIG. 5 shows an illustrative embodiment of a fingerprint sensing system implementation 500. In particular, it shows an example of an implementation of the detection unit 104, which may comprise a communication interface and command decoder block 502, a shift register and row control block 504, a shift register pre-set and clock block 506, a row select and readout block 508, and an analog-to-digital (A/D) conversion and data conditioning block 510.

The communication interface 502 may be configured to receive configuration commands and configuration data by a processing unit 106. An embedded command decoder may be configured to control the shift register and row control unit 504 in response to the commands and associated data received from the processing unit 106. Read access to individual sensor cells is controlled by the outputs of shift-registers, wherein one shift-register may control access to sensor cells being arranged in one row. Multiple of said shift-registers may enable accessing sensor cells in multiple rows. The shift register and row control unit 504 may be a state machine that in conjunction with said shift-registers may be configured to sequentially select and read individual sensor pixels of the sensor array 300. A row-select and readout unit 508 under control of the shift-register and row control unit 504 may connect an individual sensor cell to a central readout unit which may perform a capacitance-to-voltage conversion. An analog-to digital (A/D) conversion and data conditioning unit 510 may be configured to convert a voltage level provided by the readout unit 508 into its numerical representation. Said numerical representation may be communicated by the communication interface unit 502 to the processing unit 106.

Figure 6:
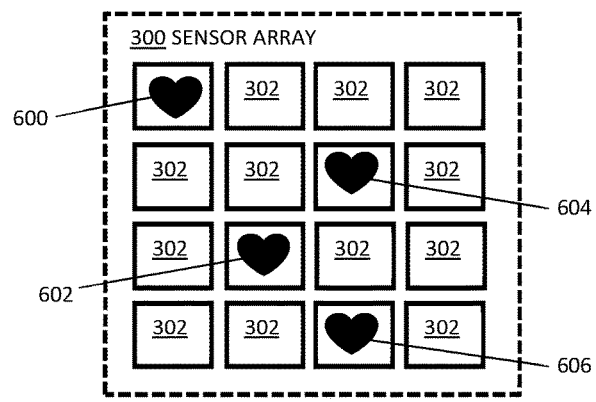
FIG. 6 shows an illustrative embodiment of a sensor array in which liveness feature positions have been identified.

FIG. 6 shows an illustrative embodiment of a sensor array 300 in which liveness feature positions 600, 602, 604, 606 have been identified. As mentioned above, in one or more embodiments, the processing unit is further configured and arranged to identify, for each change that substantially conforms to the predefined liveness function (i.e., for each liveness feature), a relative position of the corresponding sensing element 302 in the array 300 of sensing elements. These relative positions may be used to identify specific persons, because the distribution of liveness features over a given area may characterize individual human beings. Thus, these relative positions may be used to add another factor to the user authentication process. For example, in a practical yet reliable implementation, the predefined map of relative positions represents a blood vessel pattern. The predefined map of relative positions may be created in an enrollment phase of the system.

Furthermore, in a practical and efficient implementation, the processing unit may verify if the one or more identified relative positions are present in a predefined map of relative positions. The predefined map of relative positions may be stored in a storage unit, for example, as a template for identifying a particular user. Alternatively, in a more secure implementation, the processing unit may provide the one or more identified relative positions to a secure element. In that case, since the predefined map of relative positions is a piece of sensitive data, it may also be stored in said secure element. The secure element may be implemented as an embedded chip, for example as another component of a smart card. More specifically, the secure element may be implemented as a tamper-resistant integrated circuit with installed or pre-installed smart-card-grade applications, for instance payment applications, which have a prescribed functionality and a prescribed level of security. Furthermore, the secure element may implement security functions, such as cryptographic functions and authentication functions.

Figure 7:
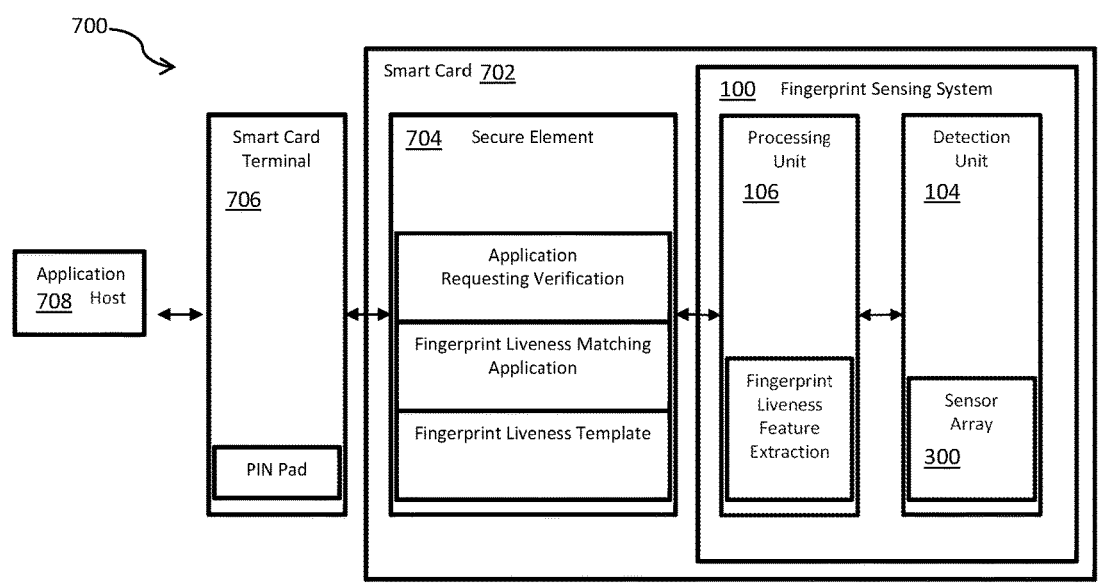
FIG. 7 shows an illustrative embodiment of a user authentication system.

FIG. 7 shows an illustrative embodiment of a user authentication system 700. The user authentication system 700 comprises a smart card 702, a smart card terminal 706 and an application host 708. In operation, the smart card 702 may be presented to the smart card terminal 706 in order to initiate a transaction and to authenticate the user to an application host 708. The application host 708, e.g. a cloud server, may be configured to perform the transaction. The smart card 702 may comprise a fingerprint sensing system 100 of the kind set forth and a secure element 704. As mentioned above, the processing unit 106 may identify relative positions of liveness features in a sensor array 300 detected by the detection unit 104. These relative positions may be verified, by the secure element 704, against a map of relative positions (i.e. a template) stored in the secure element 704. Alternatively, as mentioned above, the processing unit 106 may perform said verification without involving the secure element 704.

It is noted that, by using a fingerprint sensing system of the kind set forth, the user authentication may rely on different levels or layers: (1) the fingerprint itself, which is a first biometric factor; (2) a liveness verification, i.e. a verification whether the fingerprint belongs to a living person, which is a second biometric factor; (3) a liveness feature template comparison, i.e. verification whether the liveness features of the fingerprint belong to a specific person, which is a third biometric factor. In order to achieve a high security level, all layers may be used, without degrading the user convenience. This may provide a high confidence that an enrolled living user is applying his finger on a fingerprint sensor. Traditional fingerprint fraud methods (i.e., presenting a glue tape with a captured fingerprint image of a person to a fingerprint sensor) may effectively be blocked by deploying the presently disclosed fingerprint sensing system and method.

The systems and methods described herein may at least partly be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (PDA), smartphone, tablet etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 fingerprint sensing system
102 sensing element
104 detection unit
502 communication interface and command decoder
504 shift register and row control
506 shift register pre-set and clock
508 row select and readout
510 A/D conversion and data conditioning
106 processing unit
200 fingerprint sensing method
202 sensing element generates a sensing characteristic
204 detection unit detects changes of sensing characteristic over time
206 processing unit determines if changes substantially conform to predefined liveness function
300 sensor array
302 sensing element
400 fingerprint sensor IC
402 finger
500 fingerprint sensing system implementation
600 liveness feature position
602 liveness feature position
604 liveness feature position
606 liveness feature position
700 user authentication system
702 smart card
704 secure element
706 smart card terminal
708 application host

The invention claimed is:

1. A fingerprint sensing system, comprising:
an array of capacitive sensors configured and arranged to measure capacitances caused by a portion of a finger located relative to the array of capacitive sensors, the capacitances comprising a first capacitance measured by at least one capacitive sensor in the array of capacitive sensors and a second capacitance measured by the at least one capacitive sensor, the first capacitance indicating a valley depth of a fingerprint of the finger at a first time and the second capacitance indicating the valley depth of the fingerprint at a second time;
a detection unit configured and arranged to detect changes of said capacitances over time based, in part, on the first capacitance and the second capacitance, wherein said capacitances change over time in response to changes in the valley depth of the fingerprint due to pulsating blood in the finger; and
a processing unit configured and arranged to determine if the changes of said capacitances substantially conform to a predefined liveness function, and to identify for each capacitance change, a relative position of a capacitive sensor in the array of capacitive sensors that is sensing the capacitance change.

2. The system of claim 1, wherein the liveness function is a reference function stored in a storage unit of the fingerprint sensing system.

3. The system of claim 1, wherein the processing unit is further configured and arranged to verify if the relative position is present in a predefined map of relative positions.

4. The system of claim 1, wherein the processing unit is further configured and arranged to provide the relative position to a secure element.

5. The system of claim 3, wherein the predefined map of relative positions represents a blood vessel pattern.

6. The system of claim 1, wherein the array of capacitive sensors has the form of a matrix.

7. The system of claim 1, wherein each of the array of capacitive sensors includes a sensing plate.

8. A smart card comprising the fingerprint sensing system of claim 1.

9. A method comprising:
measuring capacitances, using a plurality of capacitive sensors, the capacitances being caused by a portion of a finger positioned relative to the plurality of capacitive sensors, the capacitances comprising a first capacitance measured by at least one of the plurality of capacitive sensors and a second capacitance measured by the at least one of the plurality of capacitive sensors, the first capacitance indicating a valley depth of a fingerprint of the finger at a first time and the second capacitance indicating the valley depth of the fingerprint at a second time;
detecting changes of the capacitances over time based, in part, on the first capacitance and the second capacitance, wherein said capacitances change over time in response to changes in the valley depth of the fingerprint due to pulsating blood in the finger; and
determining if the changes of the capacitances substantially conform to a predefined liveness function, and to identify for each capacitance change, a relative position of a capacitive sensor in the plurality of capacitive sensors that is sensing the capacitance change.

10. A computer program product stored on a non-transitory computer-readable medium, the computer program product comprising instructions which, when executed, carry out or control the method of claim 9.

11. The method of claim 9, wherein the liveness function is a reference function stored in a storage unit of the fingerprint sensing method.

12. The method of claim 9, further comprising verifying if the relative position is present in a predefined map of relative positions.

* * * * *